US008842519B2

(12) United States Patent
Johnson et al.

(10) Patent No.: US 8,842,519 B2
(45) Date of Patent: Sep. 23, 2014

(54) NETWORK INTERFACE APPARATUS FOR BYPASSING INOPERABLE NETWORK DEVICE

(75) Inventors: Ronald Douglas Johnson, Westfield, IN (US); Mark Alan Schultz, Carmel, IN (US); Mark Allen McCleary, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1063 days.

(21) Appl. No.: 12/452,685

(22) PCT Filed: Jun. 6, 2008

(86) PCT No.: PCT/US2008/007165
§ 371 (c)(1),
(2), (4) Date: Jan. 15, 2010

(87) PCT Pub. No.: WO2009/014581
PCT Pub. Date: Jan. 29, 2009

(65) Prior Publication Data
US 2010/0135151 A1   Jun. 3, 2010

Related U.S. Application Data

(60) Provisional application No. 60/961,624, filed on Jul. 23, 2007.

(51) Int. Cl.
*H04L 12/437* (2006.01)
*H02M 3/335* (2006.01)

(52) U.S. Cl.
CPC ......... *H04L 12/437* (2013.01); *H02M 3/33576* (2013.01)
USPC ....................................... 370/221

(58) Field of Classification Search
CPC ............. H02M 3/33576; H02M 3/33561; H02J 7/0016; H04L 41/0659; H04L 12/437

USPC .............. 370/216–221; 315/276, 282; 361/38
See application file for complete search history.

(56) References Cited

U.S. PATENT DOCUMENTS 4,279,034 A    7/1981  Baxter
4,304,001 A *  12/1981 Cope .............................. 714/4.4
(Continued)

FOREIGN PATENT DOCUMENTS

EP    0109287    5/1984
EP    0133760    3/1985
(Continued)

OTHER PUBLICATIONS

Search Report dated Nov. 12, 2008.

*Primary Examiner* — Benjamin Lamont
(74) *Attorney, Agent, or Firm* — Robert D. Shedd; Reitseng Lin

(57) ABSTRACT

A network interface apparatus is capable of bypassing an inoperable or failed network device. According to an exemplary embodiment, the network interface apparatus includes first and second transformers. A network input and a network output are respectively coupled to a first side of the first transformer and a first side of the second transformer. A terminal input and a terminal output are respectively coupled to a second side of the first transformer and a second side of the second transformer. A switch assembly is coupled to the second sides of the first and second transformers. When the switch assembly is in a first state, the second side of the first transformer is coupled to the terminal output, and when the switch assembly is in a second state, the second side of the first transformer is coupled to the first side of the second transformer bypassing the terminal output.

18 Claims, 5 Drawing Sheets

(56) References Cited

U.S. PATENT DOCUMENTS

| | | | |
|---|---|---|---|
| 4,794,632 A * | 12/1988 | Burton et al. | 379/22 |
| 5,414,708 A | 5/1995 | Webber et al. | |
| 5,555,456 A * | 9/1996 | Waite | 340/635 |
| 6,448,671 B1 | 9/2002 | Wallace et al. | |
| 7,664,012 B2 * | 2/2010 | Cohn | 370/217 |
| 2006/0291405 A1* | 12/2006 | Karam | 370/284 |
| 2006/0293190 A1 | 12/2006 | Watson et al. | |
| 2007/0025240 A1* | 2/2007 | Snide | 370/217 |
| 2007/0061056 A1 | 3/2007 | Valsorda | |
| 2008/0239978 A1* | 10/2008 | Karam et al. | 370/252 |

FOREIGN PATENT DOCUMENTS

| | | |
|---|---|---|
| EP | 0184644 | 6/1986 |
| EP | 0185876 | 7/1986 |
| EP | 1638260 | 3/2006 |
| GB | 2318262 | 4/1998 |
| JP | 58205352 | 11/1983 |
| JP | 03108846 | 5/1991 |
| WO | WO2005071953 | 8/2005 |
| WO | WO2006026054 | 3/2006 |

* cited by examiner

NETWORK INTERFACE APPARATUS FOR BYPASSING INOPERABLE NETWORK DEVICE

CROSS REFERENCE TO RELATED APPLICATION

This application claims the benefit, under 35 U.S.C. §365 of International Application PCT/US2008/007,165, filed 6 Jun. 2008, which was published in accordance with PCT Article 21(2) on 29 Jan. 20098, in English and which claims the benefit of U.S. provisional patent application No. 60/961,624, filed 23 Jul. 2007.

BACKGROUND OF THE INVENTION

1. Field of the Invention

The present invention generally relates to networks such as Ethernet networks capable of distributing content such as audio and/or video content to a plurality of associated network devices, and more particularly, to a network interface apparatus that is capable of bypassing an inoperable or failed is network device.

2. Background Information

In a network such as an Ethernet network, the failure of one network device can have a devastating affect on the flow of signals through the entire network. This is particularly true for networks connected in daisy chain fashion where signals are passed from one network device to another. This type of daisy chain connected network may be used, for example, to distribute audio and/or video signals in environments, such as on airplanes and other environments. For example, a daisy chain connected network may be used in such environments to simplify system design and minimize the length and number of cables required.

However, in a daisy chain connected network, if one network device along the daisy chained line fails, all of the remaining network devices further down the daisy chain line will also lose access to the distributed content. In an environment such as an airplane, for example, this loss would leave every passenger from the failed device and thereafter without access to the distributed content (e.g., audio and/or video content) during the flight. This loss of access would also likely produce many unhappy passengers, and a potential loss of income.

Accordingly, there is a need for a network interface apparatus for use in networks such as Ethernet networks that avoids the aforementioned problems and enables an inoperable network device to be bypassed. The invention described herein addresses these and/or other related issues.

SUMMARY OF THE INVENTION

In accordance with an aspect of the present invention, a network interface apparatus is disclosed. According to an exemplary embodiment, the network interface apparatus comprises first and second transformers. A network input and a network output are respectively coupled to a first side of the first transformer and a first side of the second transformer. A terminal input and a terminal output are respectively coupled to a second side of the first transformer and a second side of the second transformer. A switch assembly is coupled to the second sides of the first and second transformers. When the switch assembly is in a first state, the second side of the first transformer is coupled to the terminal output, and when the switch assembly is in a second state, the second side of the first transformer is coupled to the first side of the second transformer bypassing the terminal output.

In accordance with another aspect of the present invention, a method for bypassing an inoperable network device is disclosed. According to an exemplary embodiment, the method comprises the steps of receiving a first video signal from a first side of a first transformer and generating a second video signal representative of the first video signal at a second side of said first transformer; operating a switch assembly responsive to a control signal; if said switch assembly is operated in a first state, coupling said second video signal to a terminal output of a network device and coupling said second video signal to a second side of a second transformer from said output terminal of said network device; if said switch assembly is operated in a second state, coupling said second video signal to said second side of said second transformer bypassing said terminal output; and generating a third video signal representative of said second video signal at a first side of said second transformers.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the to accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
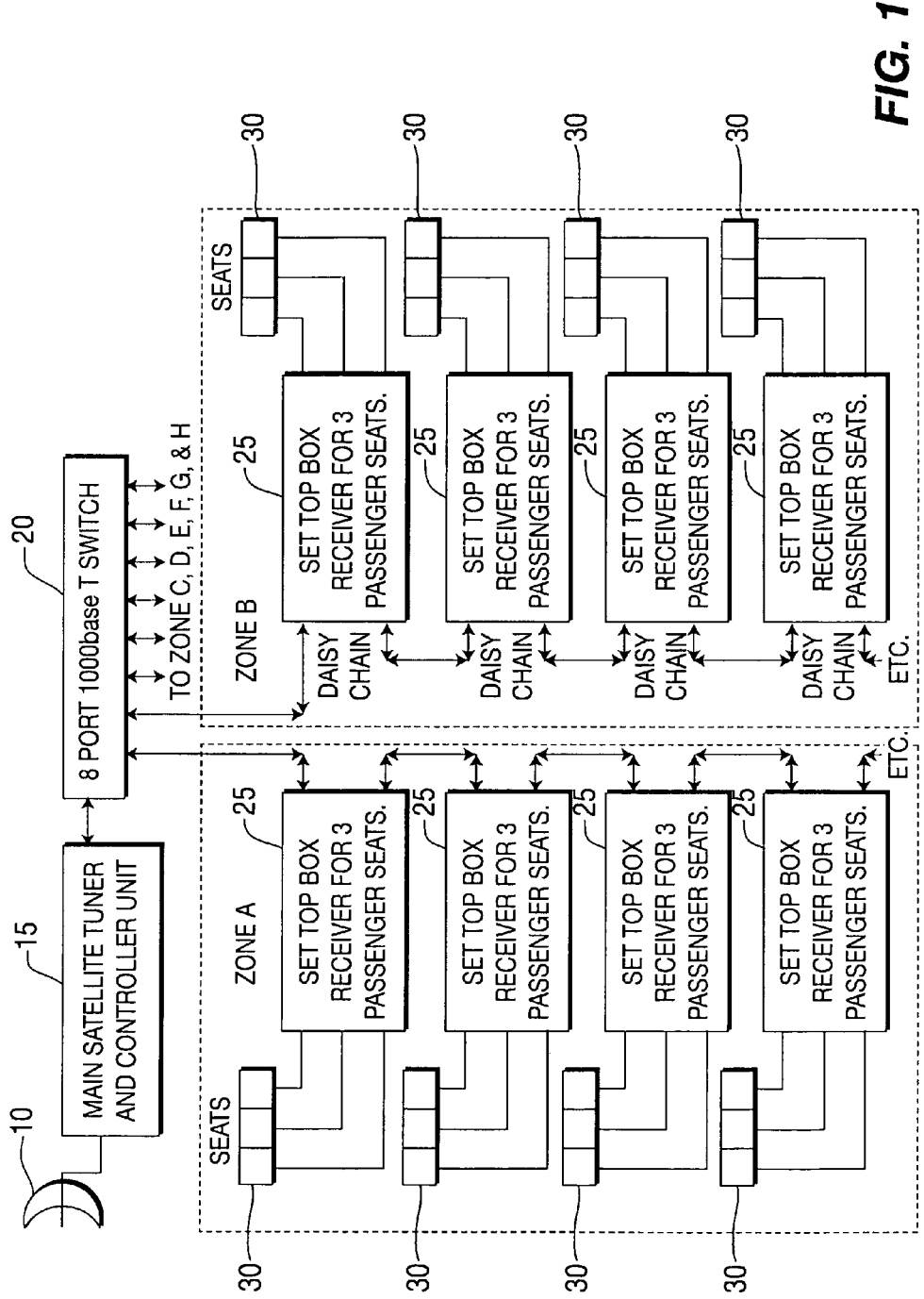
FIG. 1 is an exemplary system suitable for implementing the present invention.

Referring now to the drawings, and more particularly to FIG. 1, an exemplary system suitable for implementing the present invention is shown. For purposes of example and explanation, the exemplary system of FIG. 1 is represented as a digital satellite receiving system that distributes content including audio, video and/or data content via an Ethernet network in an environment that includes multiple seated users, such as airplane or other environment. It will be intuitive to those skilled in the art, however, that the principles of the present invention may be applicable to other types of content distribution systems operating in different environments.

The exemplary system of FIG. 1 comprises antenna 10, main satellite tuner and controller unit 15, a 1000baseT switch 20, a plurality of set top box receivers 25, and a plurality of seats 30. As indicated in FIG. 1, 1000baseT switch 20 distributes signals including audio and/or video signals over an Ethernet cable to set top box receivers 25 in various zones, which are shown in exemplary FIG. 1 as zones A-H. Also indicated in FIG. 1, set top box receivers 25 in each zone are daisy chained together. Accordingly, if one set top box receiver 25 along the daisy chained line fails or otherwise becomes inoperable, all of the remaining set top box receivers 25 further down the daisy chain line will lose access to the distributed content. As previously indicated herein, this loss of access would also likely produce many unhappy passengers, and a potential loss of income for the airline or other content distributor. As will be described later herein, the present invention provides a network interface apparatus that is capable of advantageously bypassing an inoperable network device, such as an inoperable set top box receiver 25 in FIG. 1, to thereby avoid the aforementioned problems.

Figure 2:
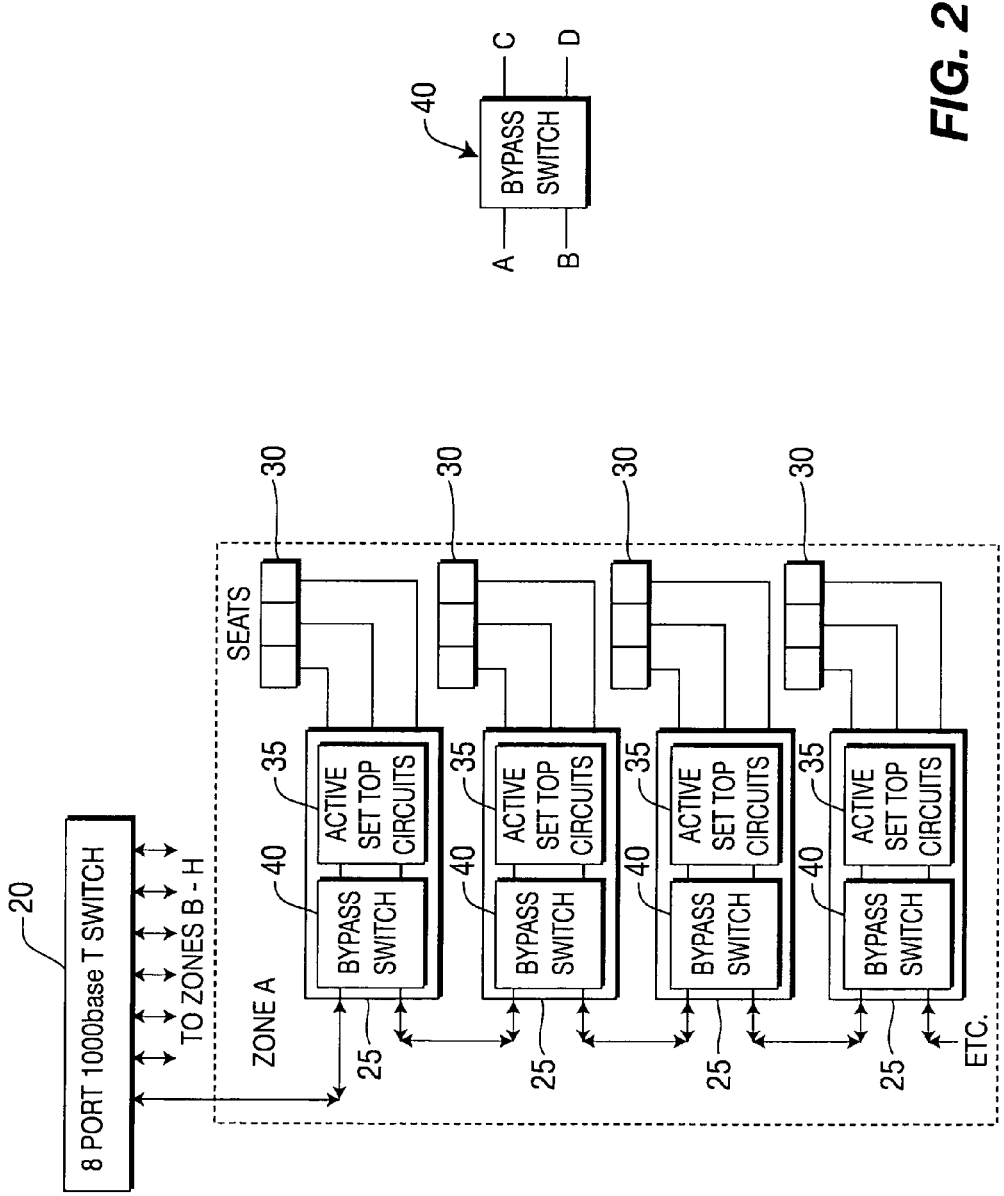
FIG. 2 is an exemplary portion of the system of FIG. 1 including an exemplary bypass switch according to principles of the present invention.

Referring now to FIG. 2, an exemplary portion of the system of FIG. 1 including an exemplary bypass switch according to principles of the present invention is shown. For purposes of example and explanation, the exemplary portion of the system of FIG. 1 shown in FIG. 2 includes only zone A. As indicated in FIG. 2, each set top box receiver 25 includes active set top box circuits 35 and a bypass switch 40. According to principles of the present invention, each bypass switch 40 is operative to perform a switching operation to bypass corresponding active set top box circuits 35 in the event such circuits 35 fail to operate properly, thereby keeping service active in the remaining set top box receivers 25 that are located further down the daisy chained line from the failed set top box receiver 25. Also indicated in FIG. 2, each bypass switch 40 includes four terminals A-D. Further details of exemplary bypass switch 40 will now be provided with reference to FIG. 3.

Figure 3:
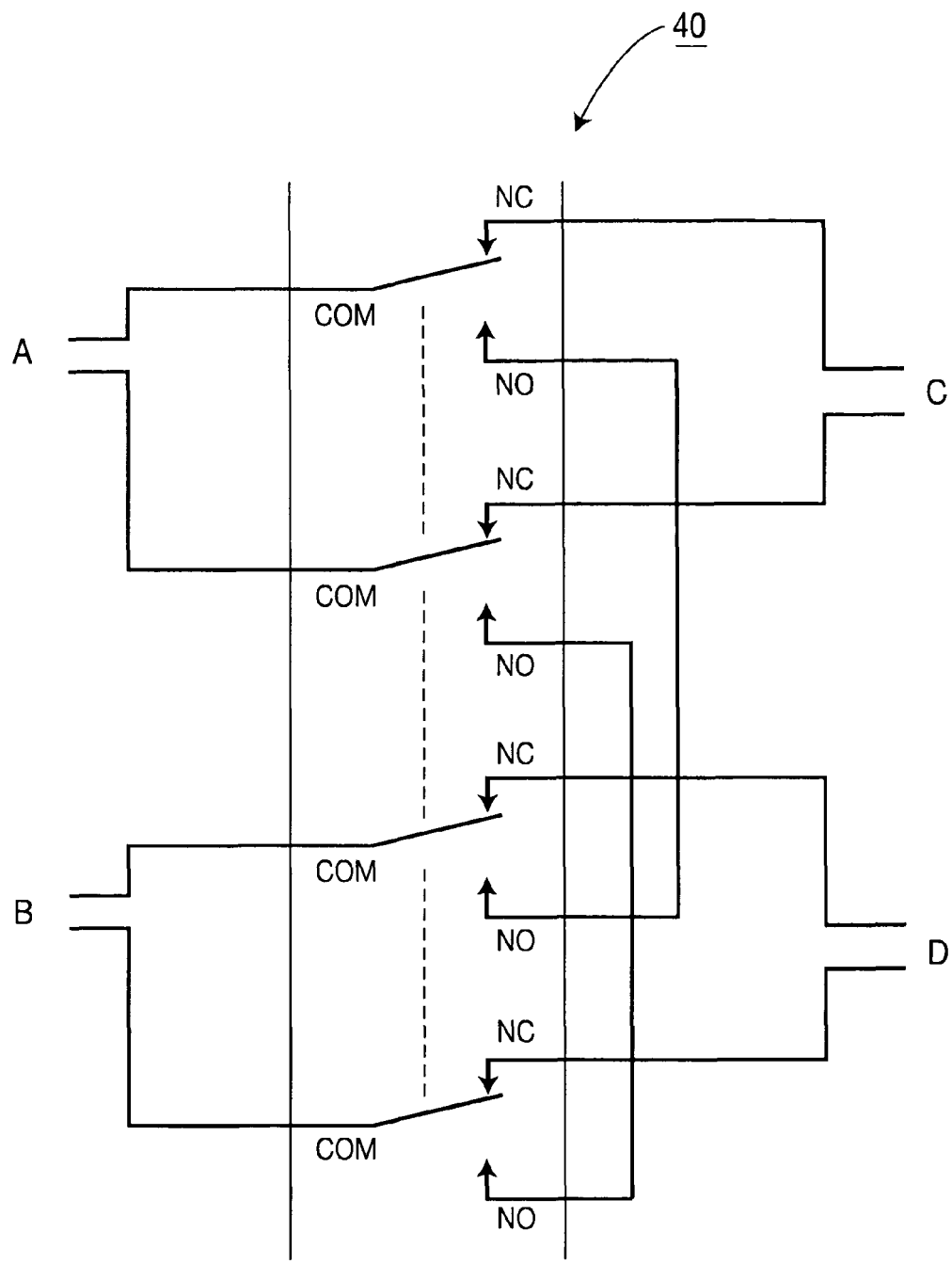
FIG. 3 shows further details of the exemplary bypass switch of FIG. 2.

Referring to FIG. 3, further details of the exemplary bypass switch 40 of FIG. 2 are shown. Bypass switch 40 of FIG. 3 represents a type of ideal bypass switch that may be used in accordance with the principles of the present invention. The basic task of bypass circuit 40 in FIG. 3 is to maintain a high-speed, two-way Ethernet connection when device circuitry (located towards the right side of FIG. 3, but not shown) fails to boot up or locks up for an unknown reason. According to an exemplary embodiment, terminals A and B represent twisted pair Ethernet jacks for respectively receiving and outputting signals from and to an Ethernet network. Terminals C and D represent physical terminals of device circuitry (e.g., active set top box circuits 35 of FIG. 2) for respectively receiving and outputting signals from and to terminals A and B.

According to an exemplary embodiment, when the COM lines of bypass switch 40 are coupled to the NC terminals in FIG. 3, a network signal first passes from terminal A to terminal C. Device circuitry (e.g., active set top box circuits 35 of FIG. 2) coupled to terminal C receives the network signal and ultimately passes the same to terminal D which in turn passes the network signal to terminal B for output to the Ethernet network. Conversely, when the COM lines of bypass switch 40 are coupled to the NO terminals in FIG. 3, a network signal received at terminal A is passed directly to terminal B, thereby bypassing terminals C and D and the device circuitry connected thereto. Ideally, neither a power supply nor active Ethernet receiver/transmitter devices would be needed in this bypass application. However, a real solution will need power and some form of isolation from electrical discharge on the lines since semiconductor switches will be used. These implementation details will now be described with reference to FIG. 4.

Figure 4:
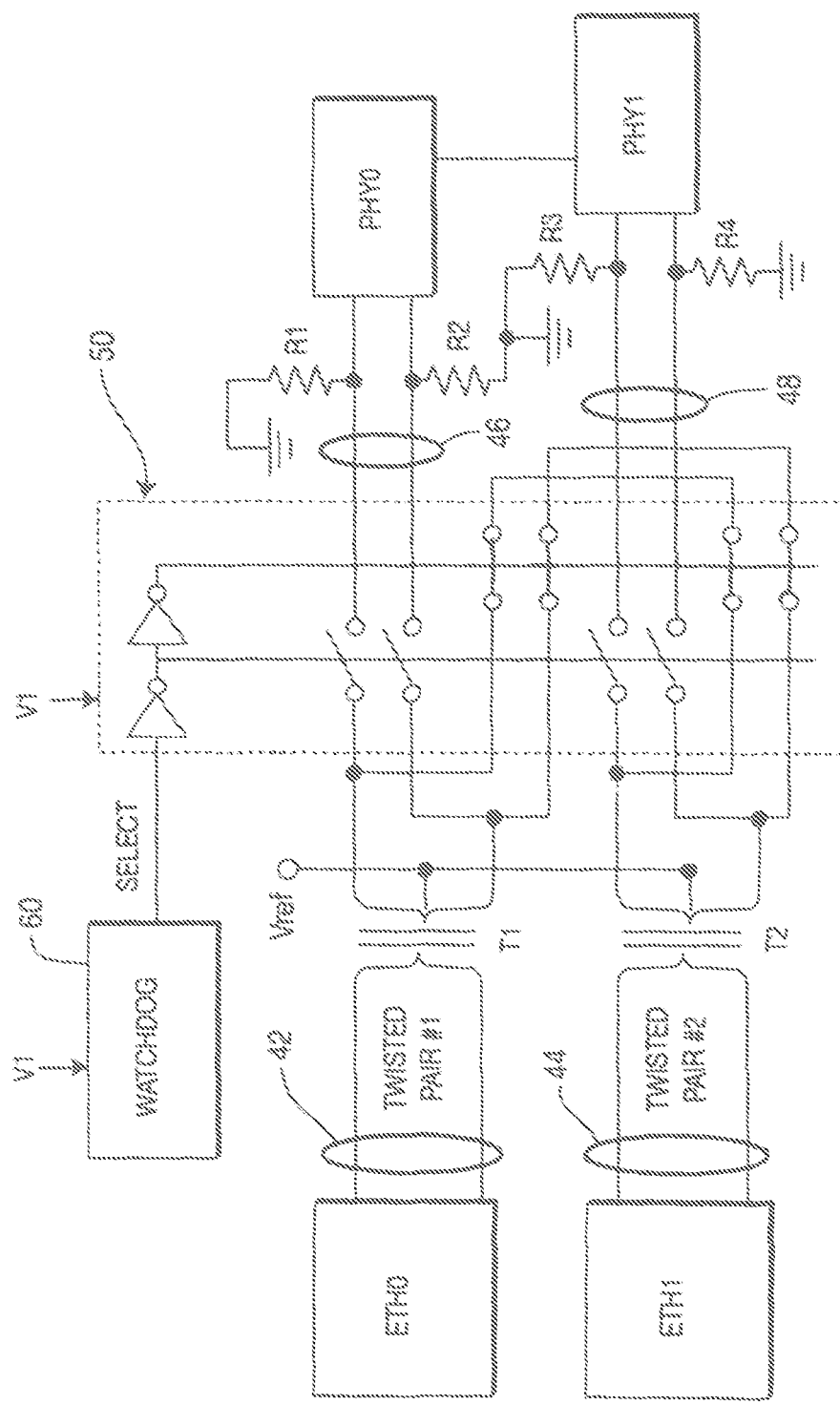
FIG. 4 is a diagram including a network interface apparatus according to an exemplary embodiment of the present invention.

Referring to FIG. 4, a diagram including a network interface apparatus according to an exemplary embodiment of the present invention is shown. The exemplary network interface apparatus of FIG. 4 comprises first and second transformers T1 and T2, each having a first side and a second side. The second sides of first and second transformers T1 and T2 are coupled to a reference voltage Vref, as indicated in FIG. 4. A network input 42 and a network output 44 are respectively coupled to the first side of first transformer T1 and the first side of second transformer T2. As indicated in FIG. 4, network input 42 and network output 44 each represent a twisted pair Ethernet jack for respectively receiving and outputting network signals from and to an Ethernet network represented as ETH0 and ETH1. A terminal input 46 and a terminal output 48 are respectively coupled to the second side of first transformer T1 and the second side of second transformer T2. Terminal input 46 and terminal output 48 each represent a physical terminal of device to circuitry represented in FIG. 4 as PHY0 and PHY1 for respectively receiving and outputting signals from and to network input 42 and network output 44.

Also in FIG. 4, a switch assembly 50 is coupled to the second sides of first and second transformers T1 and T2. Switch assembly 50 may for is example be constructed from an analog multiplexer switch such as an STMUX1000L type of switch. As indicated in FIG. 4, switch assembly 50 comprises inverters and a plurality of sets of switches. For purposes of example and explanation, four (4) sets of switches are shown in FIG. 4. However, the number of sets of switches may vary as a matter of design choice. The switches of switch assembly 50 may be constructed using MOSFETs and/or other types of semiconductor elements.

According to principles of the present invention, switch assembly 50 operates in a normal mode (i.e., a first state) and a bypass mode (i.e., a second state). In the normal mode, ETH0 is routed to PHY0 and then passed through PHY1 to ETH1 to the next network interface apparatus. In the bypass mode (which is represented in FIG. 4), ETH0 is routed to ETH1 with no active connections to PHY0 or PHY1. In other words, when switch assembly 50 is in the normal mode (i.e., the first and third sets of switches being closed and the second and fourth sets of switches being open), the second side of first transformer T1 is coupled to terminal output 48 via terminal input 46, PHY0 and PHY1. Also in the normal mode, network output 48 is coupled to a second network input of a second network interface apparatus (not shown in FIG. 4) via network output 44 and an Ethernet cable. Conversely, when switch assembly 50 is in the bypass mode (i.e., the first and third sets of switches being open and the second and fourth sets of switches being closed as shown in FIG. 4), the second side of first transformer T1 is coupled to the first side of second transformer T2, and thereby bypasses terminal output 48, PHY0 and PHY1.

According to principles of the present invention, the switching states of switch assembly 50 are controlled via the logic state of a select signal provided from a watchdog circuit 60. According to an exemplary embodiment, watchdog circuit 60 is operative to detect fault conditions within the applicable network, such as when a particular network device fails to boot or otherwise operate properly. In such cases, watchdog circuit 60 is operative to generate and output the select signal so as to invoke the bypass mode of the applicable is switch assembly 50, and thereby bypass the inoperable network device. This functionality makes the network interface apparatus of FIG. 4 particularly beneficial for use in systems such as the two-way Ethernet-based system of FIG. 1 where individual network devices are connected in a daisy chained fashion.

A few additional items to note regarding the network interface apparatus of FIG. 4 are that switch assembly 50 is fairly resistant to electrostatic discharge exposure since it is isolated from the network by first and second transformers T1 and T2. Also, termination resistors R1 and R2 are preferably provided between terminal input 46 and PHY0, and termination resistors R3 and R4 are preferably provided between terminal output 48 and PHY1, as shown in FIG. 4. Exemplary values for resistors R1-R4 are 50 ohms each, although other values may also be used based on the specific application. According to principles of the present invention, resistors R1-R4 are advantageously removed from the transmission line during the bypass mode, thereby leaving the transmission line unaffected so that high-speed, bi-directional communication can continue.

Another aspect of the network interface apparatus of FIG. 4 is that switch assembly 50 should preferably be powered at all times to allow the inverters and MOSFET switches to operate properly. According to principles of the present invention, a DC operating voltage V1 for switch assembly 50 and watchdog circuit 60 may be advantageously derived from a network signal itself.

Figure 5:
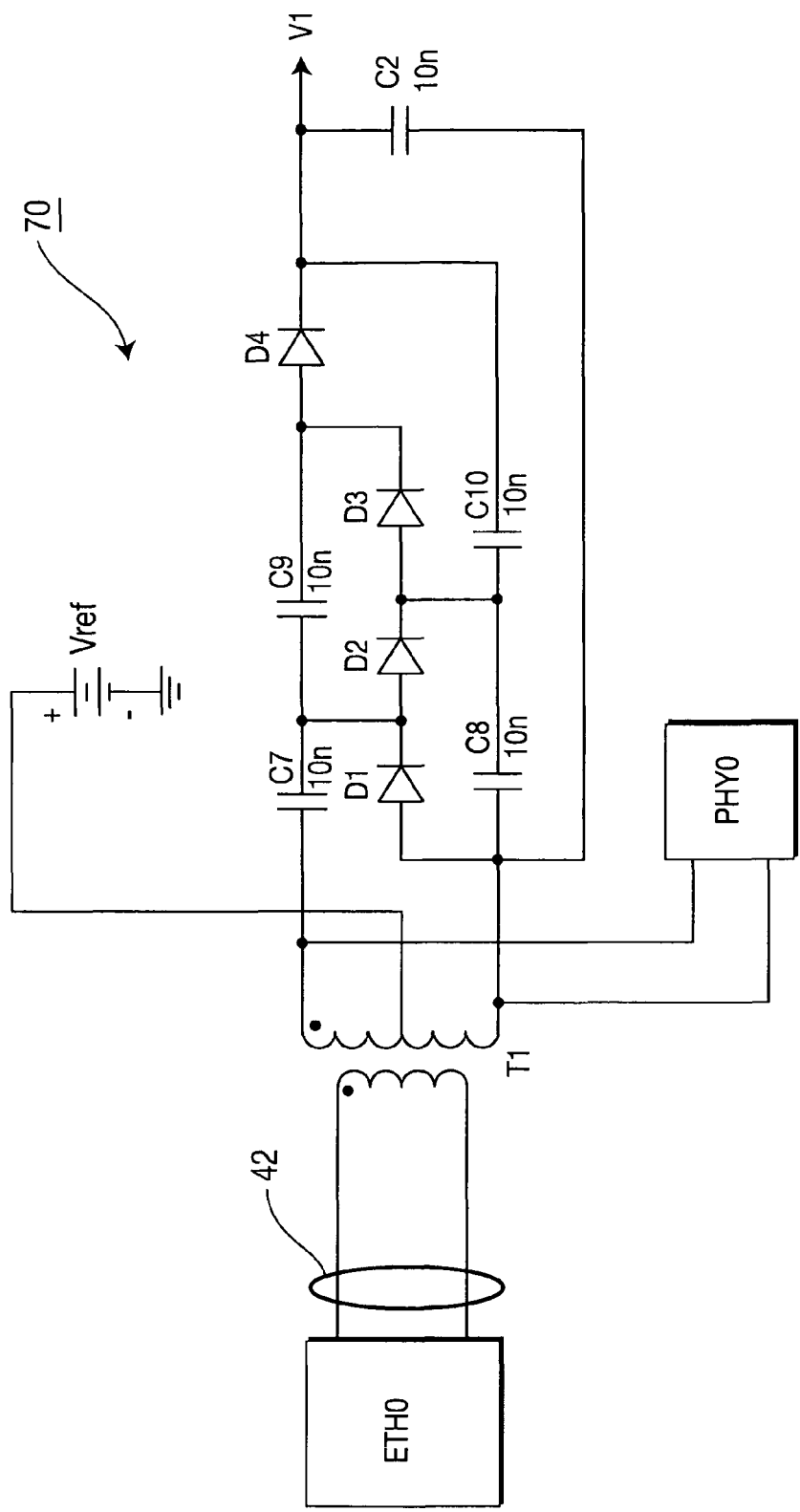
FIG. 5 is a circuit for generating an operating voltage from a network signal according to an exemplary embodiment of the present invention.

Referring to FIG. 5, circuitry 70 for generating operating voltage V1 from a network signal according to an exemplary embodiment of the present to invention is shown. As indicated in FIG. 5, circuitry 70 comprises a plurality of diodes D1-D4 and a plurality of capacitors C2 and C7-C10. Exemplary values for these circuit elements are shown in FIG. 5, although other values may also be used depending on the particular application. In FIG. 5, a network signal such as an Ethernet signal received via network input 42 and first transformer T1 is operated upon by circuit elements D1-D4 and C2 and C7-C10 to generate DC operating voltage V1 which may be used to power switch assembly 50 and watchdog circuit 60. In this manner, switch assembly 50 and watchdog circuit 60 may be advantageously powered at all times in which the network is active.

As described herein, the network interface apparatus can perform the following steps: receiving a first video signal from a first side of a first transformer (T1) and generating a second video signal representative of the first video signal at a second side of said first transformer (T1); operating a switch assembly (50) responsive to a control signal; if said switch assembly (50) is operated in a first state, coupling said second video signal to a terminal output (48) of a network device and coupling said second video signal to a second side of a second transformer (T2) from said output terminal (48) of said network device; if said switch assembly (50) is operated in a second state, coupling said second video signal to said second side of said second transformer (T2) bypassing said terminal output; and generating a third video signal representative of said second video signal at a first side of said second transformers (T2). The third video signal can be transmitted to an input of a next network interface apparatus.

As described herein, the present invention provides a network interface apparatus that is capable of bypassing an inoperable network device. While this invention has been described as having a preferred design, the present invention can be further modified within the spirit and scope of this disclosure. This application is therefore intended to cover any variations, uses, or adaptations of the invention using its general principles. Further, this to application is intended to cover such departures from the present disclosure as come within known or customary practice in the art to which this invention pertains and which fall within the limits of the appended claims.

The invention claimed is:

1. A network interface apparatus, comprising:
   first and second transformers;
   a network input and a network output respectively coupled to a first side of said first transformer and a first side of said second transformer and coupling said network interface apparatus to a network comprising a plurality of network devices coupled in a daisy chain manner, each said network device being operative to receive a network signal including at least one of audio and video content;
   a terminal input and a terminal output respectively coupled to a second side of said first transformer and a second side of said second transformer and being coupled to a first one of said network devices;
   a watchdog circuit operative to detect if a fault condition arises for one of said network devices;
   a switch assembly, controlled by said watchdog circuit, and coupled to said second sides of said first and second transformers, wherein:
   when said switch assembly is in a first state, said network signal received at said network input is passed to said first network device and a second network device coupled to said first network device in said network; and
   when said switch assembly is in a second state, said network signal received at said network input is not passed to said first network device but is passed to said second network device; and
   circuitry, coupled to said network, and operative to receive and process said network signal to generate a first signal as an operating voltage for said watchdog circuit and said switch assembly, and further operative to provide the at least one of audio or video content different from said first signal to said first network device.

2. The network interface apparatus of claim 1, wherein said fault condition includes failing to boot.

3. The network interface apparatus of claim 1, wherein said operating voltage is a DC voltage.

4. The network interface apparatus of claim 1, wherein said switch assembly includes a MOSFET.

5. The network interface apparatus of claim 1, wherein said circuitry is coupled to said second side of said first transformer and comprises at least one diode and at least one capacitor.

6. The network interface apparatus of claim 1, wherein said network includes an Ethernet network.

7. A method, comprising steps of:
   providing a network interface apparatus comprising first and second transformers, a network input and a network output respectively coupled to a first side of said first transformer and a first side of said second transformer, a terminal input and a terminal output respectively coupled to a second side of said first transformer and a second side of said second transformer, a watchdog circuit, a switch assembly and a power circuit;
   enabling a user to couple said network interface apparatus to a network comprising a plurality of network devices each operative to receive a network signal including at least one of audio and video content, wherein said network input and said network output are coupled to said network and said terminal input and said terminal output are coupled to a first one of said network devices;
   detecting, via said watchdog circuit, if a fault condition arises for one of said network devices;
   controlling said switch assembly in response to a control signal from said watchdog circuit, wherein:

when said switch assembly is in a first state, said network signal received at said network input is passed to said first network device and a second network device coupled to said first network device in said network; and when said switch assembly is in a second state, said network signal received at said network input is not passed to said first network device but is passed to said second network device; and processing, via said power circuit, said network signal to generate a first signal as an operating voltage for said watchdog circuit and said switch assembly, to provide the at least one of audio or video content different from said first signal to said first network device.

8. The method of claim 7, wherein said fault condition includes failing to boot.

9. The method of claim 7, wherein said operating voltage is a DC voltage.

10. The method of claim 7, wherein said switch assembly includes a MOSFET.

11. The method of claim 7, wherein said power circuit is coupled to said second side of said first transformer and comprises at least one diode and at least one capacitor.

12. The method of claim 7, wherein said network includes an Ethernet network.

13. A network interface apparatus, comprising:
first and second transformers;
first input means and first output means respectively coupled to a first side of said first transformer and a first side of said second transformer and coupling said network interface apparatus to a network comprising a plurality of network devices each operative to receive a network signal including at least one of audio and video content;
second input means and second output means respectively coupled to a second side of said first transformer and a second side of said second transformer and being coupled to a first one of said network devices;
detecting means for detecting if a fault condition arises for said first network device;
switching means, controlled by said detecting means, and coupled to said second sides of said first and second transformers, wherein:
when said switching means is in a first state, said network signal is passed to said first network device and a second network device coupled to said first network device in said network; and
when said switching means is in a second state, said network signal is not passed to said first network device but is passed to said second network device; and
means for processing said network signal to generate a first signal as an operating voltage for said detecting means and said switching means, and to provide the at least one of audio or video content different from said first signal to said first network device.

14. The network interface apparatus of claim 13, wherein said fault condition includes failing to boot.

15. The network interface apparatus of claim 13, wherein said operating voltage is a DC voltage.

16. The network interface apparatus of claim 13, wherein said switching means includes a MOSFET.

17. The network interface apparatus of claim 13, wherein said means for processing is coupled to said second side of said first transformer and comprises at least one diode and at least one capacitor.

18. The network interface apparatus of claim 13, wherein said network includes an Ethernet network.

* * * * *